United States Patent [19]

Feauto et al.

[11] Patent Number: 4,709,446

[45] Date of Patent: Dec. 1, 1987

[54] SMOKE HOUSE TREE

[76] Inventors: Leo Feauto, P.O. Box 12, Jackson, Nebr. 68743; Harold Gill, 316 W. 15th, South Sioux City, Nebr. 68776

[21] Appl. No.: 836,112

[22] Filed: Mar. 4, 1986

[51] Int. Cl.⁴ .............................................. A22C 7/00
[52] U.S. Cl. .................................... 17/1 R; 100/194; 100/910; 100/265
[58] Field of Search ................ 17/1 R, 44.2; 100/194, 100/265, 269 R, 910

[56] References Cited

U.S. PATENT DOCUMENTS 3,473,465 10/1969 Tonjum ............................... 100/194
3,618,511 11/1971 Matthews ........................ 100/265 X
4,604,949 8/1986 Giese ................................ 17/44.2 X Primary Examiner—Willie G. Abercrombie
Attorney, Agent, or Firm—B. Craig Killough

[57] ABSTRACT

A device is disclosed herein which may be used to simultaneously squeeze and shape a quantity of hams or other meats during the cooking process. The device comprises pairs of racks or trays with one of each pair being fixed and one movable. The pairs of racks are spring loaded to pull the movable rack toward the fixed rack to squeeze and shape the meat located between them during the cooking process. A hydraulic cylinder or other power means is attached and actuated to simultaneously separate the trays before and after the cooking process to load and unload hams.

4 Claims, 5 Drawing Figures

SMOKE HOUSE TREE

BACKGROUND AND SUMMARY OF THE INVENTION

This invention relates generally to the field of curing and processing hams and other meats, and is more particularly related to a device which will simultaneously squeeze a great number of hams or other meats during the smoking or cooking process to remove trapped air and water and to shape the hams or other meats, and to facilitate the loading and unloading of the meat into and out of the device.

Hams or other meats which are cooked in commercial quantities are placed on trays or screens for cooking. During the cooking process, it is desirable to remove air bubbles, juice and water from the meats. This is accomplished by squeezing the meats in some fashion during the cooking process which, in the prior art, has been done by manually pressing the hams between trays or screens.

In the prior art, hams or other meats which are to be cooked or smoked are placed upon a screen or tray, with a second screen or tray placed over the meat. The trays are then connected by springs placed around the perimeters of the trays, which connect the trays, and apply pressure to the meat by means of the spring tension. In the prior art it has been necessary to manually attach the springs to the trays prior to moving the meat to the processing area, and to manually remove the springs after processing is completed.

The present invention provides a device which can be used to squeeze hams or other meats during the cooking process to remove air bubbles, juice and water, and further to apply pressure to shape the meats. The invention provides a series of parallel screens or trays, being alternately fixed and movable. Mechanical means such as a hydraulic cylinder is used to displace the movable screen or tray toward the fixed tray, with return provided by springs located between the screens or trays as will be seen. The series of trays are connected as will be seen to make up one smoke house tree. The smoke house tree may in turn be placed upon a rail and trolley for movement to and from the cooking area. The hydraulic cylinder is quickly and easily attached and removed in the cooking area for use, so that the hydraulic cylinder may be used on more than one unit of the smoke house tree. The smoke house tree may be used for processing hams or other meats during the cooking process.

The primary feature of the present invention is that mechanical means can be used to spread the pairs of trays or screens for the loading or unloading of the hams or other meats. It is no longer necessary to remove and attach the springs for loading and unloading the meat. This allows additional springs to be used without inconvenience, and springs may be conveniently placed on parts of the tray other than the perimeter of the tray. Additionally, due to the mechanical means, springs with stronger spring tension, which are more effective in squeezing and shaping the meats, may be used. Further, the invention as disclosed herein allows several pairs of trays to be simultaneously spread for the loading and the unloading of the meat. This allows several pairs of screens or trays to be assembled as a smoke house tree unit, and the entire unit may be conveniently moved by rail or trolley to the smoking or cooking area.

DETAILED DESCRIPTION OF THE DRAWINGS

DETAILED DESCRIPTION OF THE PREFERRED EMBODIMENT

Figure 1:
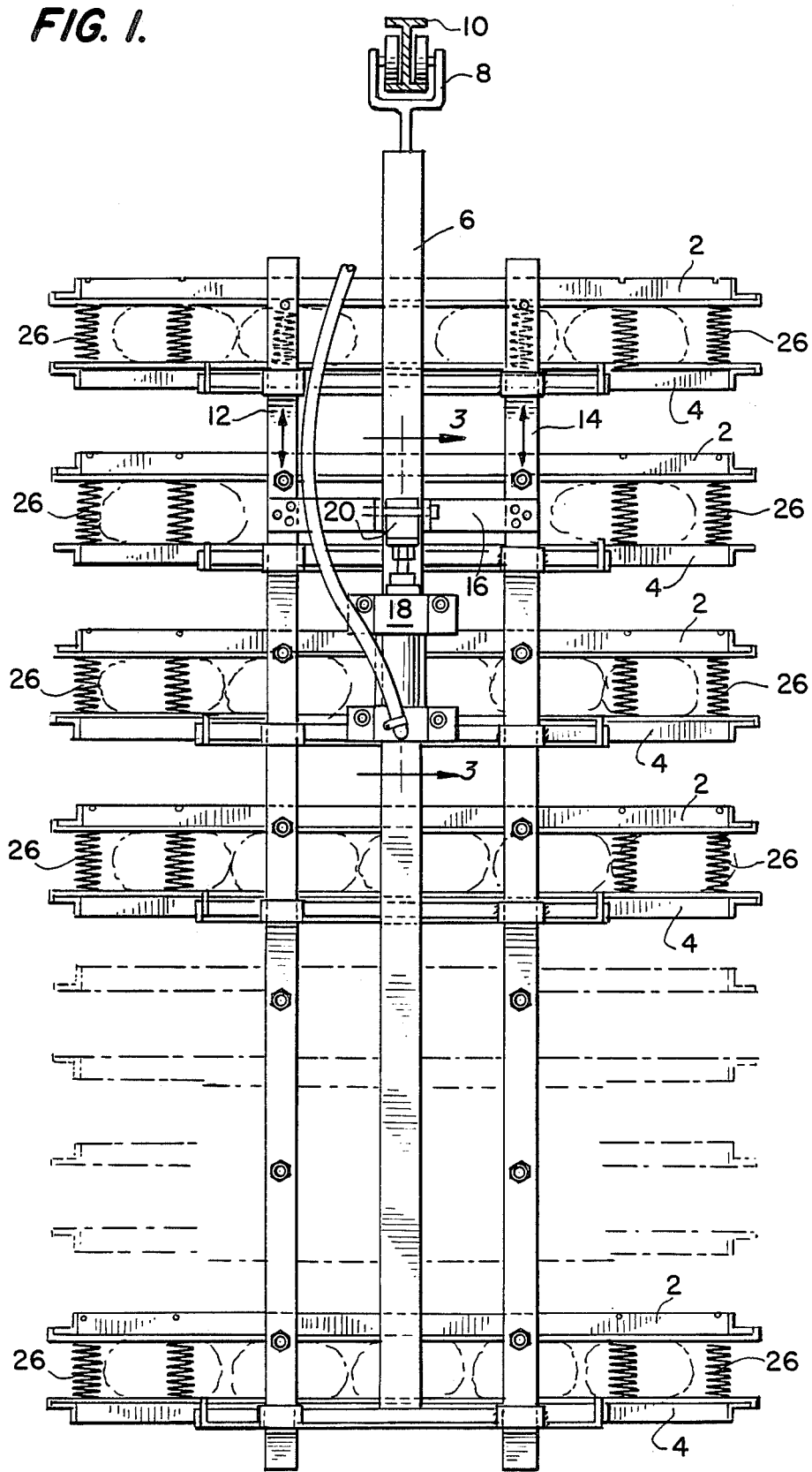
FIG. 1 is a side elevation of the smoke house tree showing a hydraulic cylinder attached thereto, and depicting some of the pairs of racks as a phantom, and showing meat placed within the racks as phantoms.

This invention incorporates pairs of screens or trays between which hams or other meats are placed for cooking or smoking process. The screens or trays are generally rectangular in shape with the plane of the trays being parallel to the floor or ground. A multiplicity of pairs of screens or trays, assembled as will be seen herein, constitute a smoke house tree. In the preferred embodiment, there are seven (7) pairs of trays, although any number could be selected. The trays are fashioned so that water and juices which are removed from the meat may drip through the trays.

The trays operate in pairs. Each pair has an upper tray 2 and a lower tray 4, with the upper tray 2 being movable in a vertical direction, while the corresponding tray 4 is fixed. Otherwise, each tray is essentially identical to each of the other trays. In the preferred embodiment, the lower tray 4 of the pair is fixed, while the upper tray 2 is movable. The trays are spread apart, and meats are placed on the lower, fixed tray 4. After loading, springs 26 cause the upper tray 2 to be pulled against the meats, and the entire unit is moved to the cooking area. During the cooking process, the upper tray 2 is pulled toward the lower tray 4 by springs 26 applying pressure to the meat, which squeezes air bubbles, water and juices from the meat so as to facilitate the cooking process, and which shapes the meat, which is desirable for various reasons including packaging.

As indicated, springs 26, which are located between the trays, pull the upper tray 2 toward the lower tray 4 so as to apply pressure upon the meat during the cooking process. After the completion of the cooking process, by mechanical means, each upper tray 2 on the smoke house tree is simultaneously forced away from the lower tray 4 so as to spread the upper and lower tray, allowing the meat to be removed. It is unnecessary to remove the springs 26 which connect the upper and lower tray. All of the trays which constitute a smoke house tree unit may be loaded and unloaded simultaneously.

In the preferred embodiment, the fixed trays 4 are attached at each end to frame 6, which is a vertical support member, which is in turn attached to trolley 8 which runs on an overhead rail 10. The movable trays 2 are attached to members which are capable of displacement relative to frame 6, being in the preferred embodiment two vertical members 12, 14 located at each end of the smoke house tree, with one of said members on each side of and parallel to frame 6. Members 12, 14 are connected to each other by horizontal member 16. Members 12, 14 may then be displaced in concert parallel to the frame member 6, with displacement accomplished by power means. In the preferred embodiment, this power means is a hydraulic cylinder 18.

Figure 2:
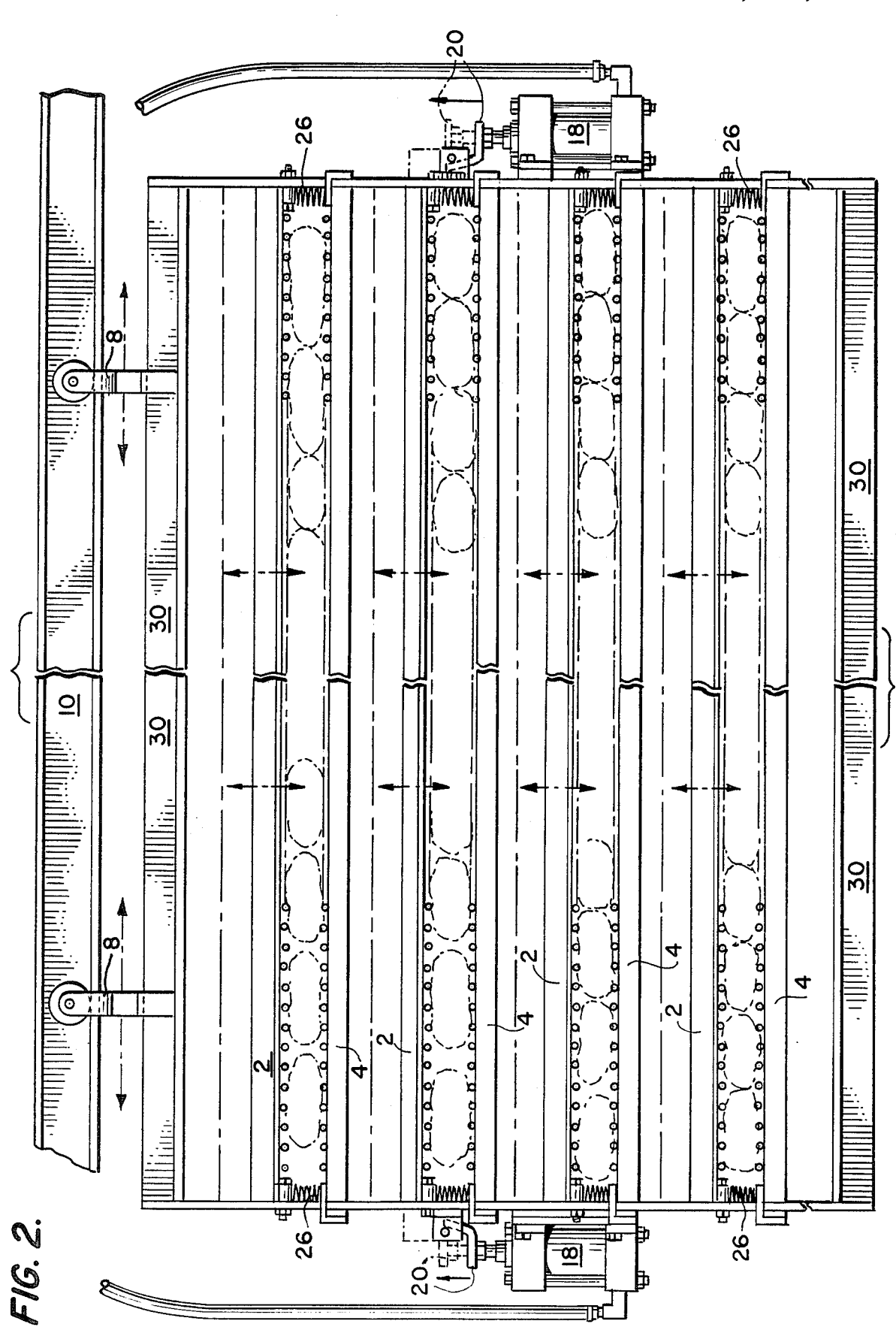
FIG. 2 is a front elevation of the smoke house tree, showing a hydraulic cylinder attached to each side of the smoke house tree, and showing as phantoms, hams placed within the racks.
Figure 3:
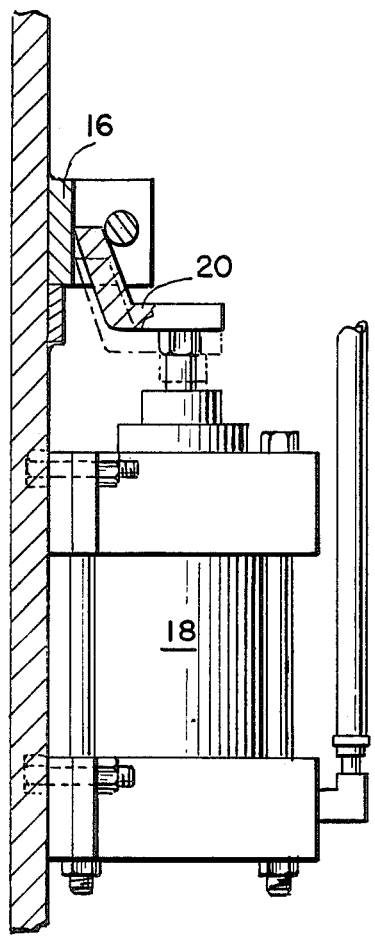
FIG. 3 is an enlarged isolation of the hydraulic cylinder as it is connected to the smoke house tree.
Figure 4:
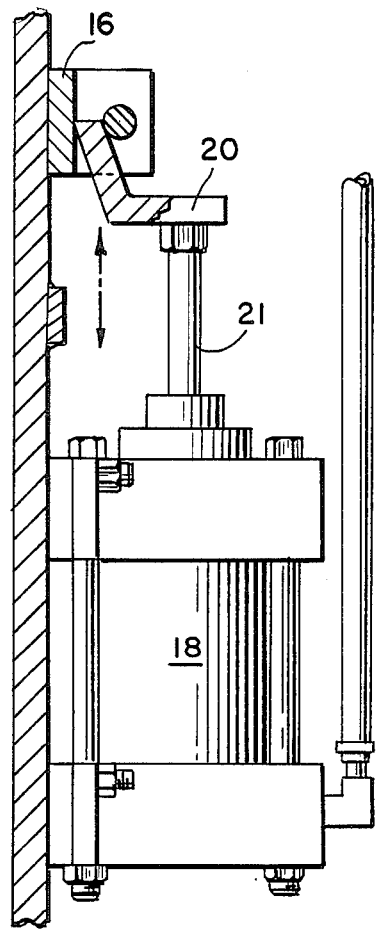
FIG. 4 is an action view, showing the action of the hydraulic cylinder shown in FIG. 3.
Figure 5:
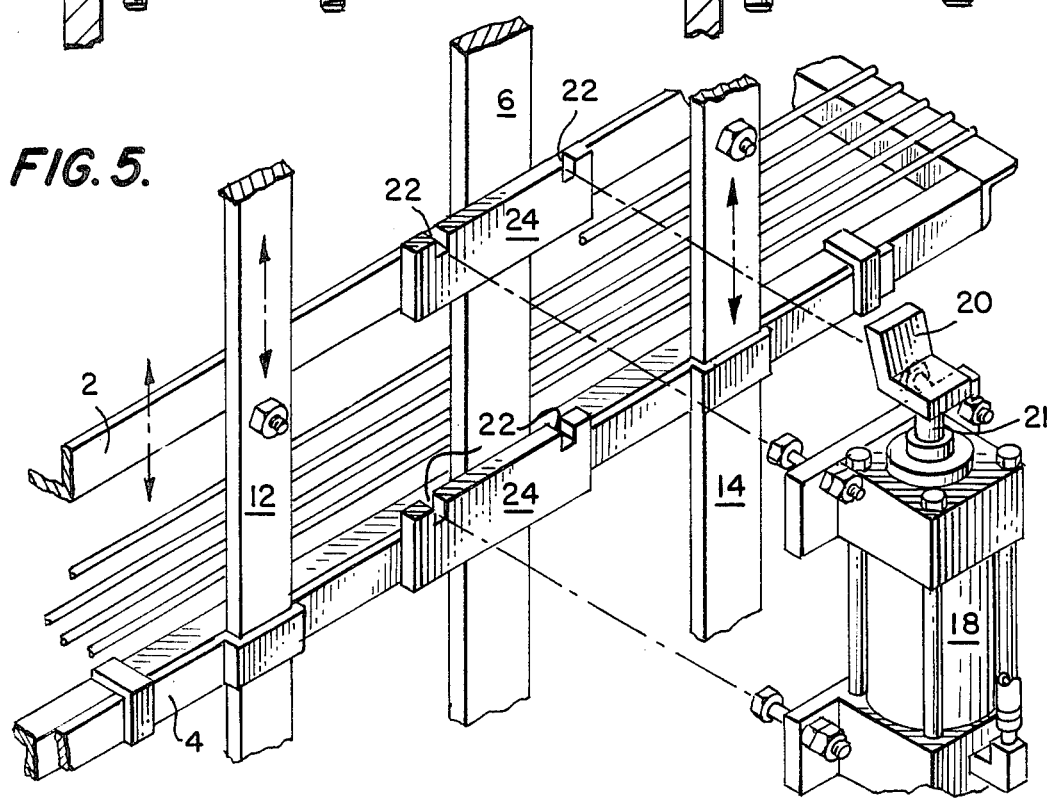
FIG. 5 is a fragmentary, perspective showing attachment of the hydraulic cylinder to the smoke house tree.

Hydraulic cylinder 18 may be quickly and easily positioned and removed from the frame 6. As shown in FIGS. 3, 4, and 5, a fitting 20 on piston 21 is placed within horizontal member 16, and hydraulic cylinder 18 fits within slots 22 on bars 24 which are attached to frame 6. Hydraulic cylinder 18 may then be actuated to displace members 12, 14 which in turn causes the upper, movable trays 2 to move relative to the lower trays 4. Return of the movable trays is provided by the series of springs 26 located between the trays 2, 4. In the preferred embodiment there is a hydraulic cylinder 18 located on each end of the smoke house tree, with six (6) springs 26 at each end of each pair of trays, shown in FIGS. 1 and 2. Frames 6 at each end are connected by rails 30.

In use, the smoke house tree is connected to an overhead trolley or rail. The smoke house tree is moved by this means to a loading area. Hydraulic cylinder 18 is attached to the smoke house tree as described above, and actuated so as to displace the upper, movable tray of each pair simultaneously. The meat is then loaded onto each fixed tray 4, and after loading, the pressure applied by the hydraulic cylinder is relieved so as to allow the springs 26 to pull the movable trays 2 toward the fixed trays 4, squeezing the meat as described hereinabove. The smoke house tree unit is then moved to the cooking or smoking area, where it remains until the smoking or cooking process is complete. After the process is complete, the smoke house tree unit is then moved back to the loading and unloading area, where the hydraulic cylinder is again used to displace the moveable tray for unloading of the meats from the smoke house tree. In this fashion, one hydraulic cylinder may service several smoke house trees.

The present invention provides a mechanical means for facilitating the loading and unloading of a smoke house tree. It allows the several pairs of spring loaded trays which make up the smoke house tree to be loaded and unloaded with meat simultaneously. It allows one hydraulic cylinder to service several smoke house tree units. It does not require, under normal use, any assembly or disassembly of the trays or springs.

It is contemplated that the smoke house tree will be primarily used for the cooking and processing of hams. However, it may be used for the cooking or processing of virtually any kind of meat wherein is desirable to press the meat during the process to remove excess water or to shape the meat.

What is claimed is:

1. A smoke house tree for pressing and shaping meat during a curing or smoking process:
    a. a multiplicity of pairs of racks with each pair comprised of a fixed rack in a parallel plane with a movable rack;
    b. a multiplicity of springs located between each of said fixed and movable racks which pull each of said movable racks toward its corresponding fixed rack independently of other pairs of racks;
    c. a frame by which said smoke house tree is suspended, and to which said fixed rack of each of said pairs of racks is attached;
    d. a member which is capable of displacement in a parallel fashion relative to said frame to which each of said movable racks is attached so as to displace said movable racks parallel to and away from said fixed racks in unison as said member is displaced;
    e. means for displacing said member.

2. A smoke house tree as described in claim 1, wherein displacement of said member is accomplished by means of a hydraulic cylinder which may be quickly attached to and removed from said smoke house tree.

3. A smoke house tree as described in claim 1, wherein said frame is suspended from a trolley for movement of said smoke house tree.

4. A smoke house tree as described in claim 2, wherein said frame is suspended from a trolley for movement of said smoke house tree.

* * * * *